United States Patent
Pang et al.

(10) Patent No.: US 9,866,350 B2
(45) Date of Patent: Jan. 9, 2018

(54) STREAMING MEDIA PACKET PROCESSING METHOD, WIFI CHIP, AND MOBILE TERMINAL

(71) Applicant: HUAWEI DEVICE (DONGGUAN) CO., LTD., Dongguan (CN)

(72) Inventors: Zhihua Pang, Shenzhen (CN); Tongbo Wang, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 25 days.

(21) Appl. No.: 15/104,065

(22) PCT Filed: Nov. 29, 2014

(86) PCT No.: PCT/CN2014/092595
§ 371 (c)(1),
(2) Date: Jun. 13, 2016

(87) PCT Pub. No.: WO2015/085875
PCT Pub. Date: Jun. 18, 2015

(65) Prior Publication Data
US 2016/0329987 A1    Nov. 10, 2016

(30) Foreign Application Priority Data
Dec. 12, 2013 (CN) .......................... 2013 1 0680646

(51) Int. Cl.
*H04L 1/00* (2006.01)
*H04L 29/06* (2006.01)
(Continued)

(52) U.S. Cl.
CPC ........ *H04L 1/0041* (2013.01); *G06F 11/1004* (2013.01); *H04L 1/0045* (2013.01);
(Continued)

(58) Field of Classification Search
CPC ... H04L 1/0041; H04L 1/0045; H04L 1/0061; H04L 1/1877; H04L 1/1838
See application file for complete search history.

(56) References Cited

U.S. PATENT DOCUMENTS

| 8,782,502 B2 | 7/2014 | Buckley |
| 2004/0123221 A1 | 6/2004 | Huffman et al. |

(Continued)

FOREIGN PATENT DOCUMENTS

| CN | 102324129 A | 1/2012 |
| CN | 102571259 A | 7/2012 |

(Continued)

OTHER PUBLICATIONS

Du et al., A real-time streaming media transmission protocol for multi-hop wireless networks, 2012, IEEE, pp. 1-4.*

(Continued)

*Primary Examiner* — Shelly A Chase
(74) *Attorney, Agent, or Firm* — Conley Rose, P.C.

(57) ABSTRACT

A streaming media packet processing method and a mobile terminal are provided. The method includes receiving a streaming media packet and determining whether the streaming media packet is an error streaming media packet according to a first cyclic redundancy check (CRC) code of the streaming media packet. If the streaming media packet is an error streaming media packet, the method includes determining whether a transmission control protocol (TCP)/internet protocol (IP) header of the streaming media packet is correct. If the TCP/IP header of the streaming media packet is correct, the method further includes determining whether the streaming media packet is preset streaming media. If the streaming media packet is preset streaming media, the method further includes calculating a second CRC of the streaming media packet, combining the second CRC with the streaming media packet, and transmitting the streaming media packet combined with the second CRC to a processor such that the processor processes the streaming media packet according to the second CRC. Hence, an anti-interference capability of the WiFi chip during stream- (Continued)

ing media transmission and a transmission stability of a multimedia service packet are improved.

10 Claims, 4 Drawing Sheets

(51) Int. Cl.
  *H04L 1/18* (2006.01)
  *G06F 11/10* (2006.01)

(52) U.S. Cl.
  CPC .......... *H04L 1/0061* (2013.01); *H04L 1/1838* (2013.01); *H04L 1/1877* (2013.01); *H04L 65/4069* (2013.01); *H04L 65/604* (2013.01); *H04L 69/16* (2013.01); *H04L 69/22* (2013.01)

(56) References Cited

U.S. PATENT DOCUMENTS

| | | | |
|---|---|---|---|
| 2008/0198781 | A1* | 8/2008 | Rajakarunanayake .................... H04L 12/2856 370/310 |
| 2008/0288845 | A1 | 11/2008 | Tsfati et al. |
| 2009/0103485 | A1 | 4/2009 | Singh et al. |
| 2013/0254353 | A1* | 9/2013 | Liu ......................... H04W 8/00 709/219 |

FOREIGN PATENT DOCUMENTS

| | | | |
|---|---|---|---|
| CN | 102611531 A | | 7/2012 |
| GB | 2502332 A | * | 11/2013 ........... H04L 1/0005 |

OTHER PUBLICATIONS

Hare et al., A network assisted system for energy efficiency in mobile devices, 2011, IEEE, pp. 1 to 10.*

Foreign Communication From a Counterpart Application, European Application No. 14869258.5, Extended European Search Report dated Sep. 7, 2016, 10 pages.

Foreign Communication From a Counterpart Application, PCT Application No. PCT/CN2014/092595, English Translation of International Search Report dated Feb. 13, 2015, 2 pages.

Foreign Communication From a Counterpart Application, PCT Application No. PCT/CN2014/092595, English Translation of Written Opinion dated Feb. 13, 2015, 6 pages.

* cited by examiner

STREAMING MEDIA PACKET PROCESSING METHOD, WIFI CHIP, AND MOBILE TERMINAL

This application is a U.S. National Stage of International Application No. PCT/CN2014/092595, filed on Nov. 29, 2014, which claims priority to Chinese Patent Application No. 201310680646.4, filed on Dec. 12, 2013, both of which are incorporated herein by reference in their entireties.

TECHNICAL FIELD

The present disclosure relates to the field of wireless communications, and in particular, to a streaming media packet processing method, a Wireless Fidelity (WiFi) chip, and a mobile terminal.

BACKGROUND

Currently, an application that transmits a multimedia service packet using a WiFi technology is increasingly popular. A WiFi channel is highly interfered with, and there are many unstable factors when a packet is transmitted using the WiFi channel.

In the prior art, a WiFi chip directly discards an error packet, and does not make full use of an error correction function of a codec to perform error correction on some specific error packets. In addition, WiFi uses an automatic repeat request (ARQ) mechanism to improve link stability. However, because a multimedia service has real time quality, retransmitting the error packet using the ARQ mechanism of WiFi results in shortfalls such as poor definition of a transmitted image, poor video fluency, and voice jitter.

SUMMARY

Embodiments of the present disclosure provide a streaming media packet processing method, a WiFi chip, and a mobile terminal in order to improve an anti-interference capability of the WiFi chip during streaming media transmission, and further improve transmission stability of a multimedia service packet.

According to a first aspect, the present disclosure provides a streaming media packet processing method, applied to a mobile terminal that includes the WiFi chip and a central processing unit, where the WiFi chip performs the following steps receiving a streaming media packet, and determining whether the streaming media packet is an error streaming media packet according to a first cyclic redundancy check (CRC) code of the streaming media packet, if the streaming media packet is an error streaming media packet, determining whether a transmission control protocol (TCP)/internet protocol (IP) header of the streaming media packet is correct, if the TCP/IP header of the streaming media packet is correct, determining whether the streaming media packet is preset streaming media, and if the streaming media packet is preset streaming media, calculating a second CRC of the streaming media packet, combining the second CRC with the streaming media packet, and transmitting the streaming media packet combined with the second CRC to the central processing unit such that the central processing unit processes the streaming media packet according to the second CRC.

According to the first aspect, in a first possible implementation manner, determining whether a TCP/IP header of the streaming media packet is correct includes determining whether the TCP/IP header of the streaming media packet is correct according to a check header of the TCP/IP header of the streaming media packet.

According to the first possible implementation manner of the first aspect, in a second possible implementation manner, calculating a second CRC of the streaming media packet includes calculating a CRC of a part of the streaming media packet excluding the TCP/IP header.

According to the first aspect or either the first or the second possible implementation manner of the first aspect, in a third possible implementation manner, determining whether the streaming media packet is preset streaming media includes determining whether the streaming media packet is a Real-time Transport Protocol (RTP) Control Protocol (RTCP) packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and directly discarding the streaming media packet.

According to the first aspect or the first, the second, or the third possible implementation manner of the first aspect, in a fourth possible implementation manner, transmitting the streaming media packet combined with the second CRC to the central processing unit such that the central processing unit processes the streaming media packet according to the second CRC includes transmitting the streaming media packet combined with the second CRC to the central processing unit such that the central processing unit calculates a third CRC of the streaming media packet combined with the second CRC, determines whether the second CRC is consistent with the third CRC, and if the second CRC is consistent with the third CRC, transmits the streaming media packet combined with the second CRC to a decoder for error correction and decoding, to obtain original multimedia information.

According to the first aspect or the first, the second, the third, or the fourth possible implementation manner of the first aspect, in a fifth possible implementation manner, determining whether the streaming media packet is an error streaming media packet includes calculating the first CRC of the streaming media packet, determining whether the first CRC obtained through calculation is consistent with a CRC in the received streaming media packet, if inconsistent, determining that the streaming media packet is an error streaming media packet, and otherwise, determining that the streaming media packet is a correct streaming media packet, and transmitting the correct streaming media packet to the central processing unit for processing.

According to a second aspect, the present disclosure provides a WiFi chip, where the WiFi chip includes a receiving unit configured to receive a streaming media packet and transmit the streaming media packet to a determining unit, the determining unit configured to receive the streaming media packet transmitted by the receiving unit, determine whether the streaming media packet is an error streaming media packet according to a first CRC code of the first streaming media packet, if the streaming media packet is an error streaming media packet, further determine whether a TCP/IP header of the streaming media packet is correct, and if the TCP/IP header of the streaming media packet is correct, further determine whether the streaming media packet is preset streaming media, and transmit a result of the determining to a calculation unit, the calculation unit configured to receive the result of the determining transmitted by the determining unit, and if the result of the determining is that the streaming media packet is preset streaming media, calculate a second CRC of the streaming media packet, and transmit the second CRC to a processing unit, and the processing unit configured to combine the second CRC with the streaming media packet, and transmit the streaming media packet combined with the second CRC to a central processing unit such that the central processing unit processes the streaming media packet according to the second CRC.

According to the second aspect, in a first possible implementation manner, a process in which the determining unit determines whether the TCP/IP header of the streaming media packet is correct includes determining whether the TCP/IP header of the streaming media packet is correct according to a check header of the TCP/IP header of the streaming media packet.

According to the first possible implementation manner of the second aspect, in a second possible implementation manner, a process in which the calculation unit calculates the second CRC of the streaming media packet includes calculating a CRC of a part of the streaming media packet excluding the TCP/IP header.

According to the second aspect or either the first or the second possible implementation manner of the first aspect of the second aspect, in a third possible implementation manner, a process in which the determining unit determines whether the streaming media packet is preset streaming media includes determining whether the streaming media packet is an RTCP packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and directly discarding the streaming media packet.

According to the second aspect or the first, the second, or the third possible implementation manner of the second aspect, in a fourth possible implementation manner, the processing unit is configured to transmit the streaming media packet combined with the second CRC to the central processing unit such that the central processing unit calculates a third CRC of the streaming media packet combined with the second CRC, determines whether the second CRC is consistent with the third CRC, and if the second CRC is consistent with the third CRC, transmits the streaming media packet combined with the second CRC to a decoder for error correction and decoding, to obtain original multimedia information.

According to the second aspect or the first, the second, the third, or the fourth possible implementation manner of the second aspect, in a fifth possible implementation manner, the calculation unit is further configured to calculate the first CRC of the streaming media packet and transmit the first CRC to the determining unit, and a process in which the determining unit determines whether the streaming media packet is an error streaming media packet according to the first CRC code of the first streaming media packet includes determining whether the first CRC obtained through calculation is consistent with a CRC in the received streaming media packet, if inconsistent, determining that the streaming media packet is an error streaming media packet, and otherwise, determining that the streaming media packet is a correct streaming media packet, and transmitting the correct streaming media packet to the central processing unit for processing.

According to a third aspect, an embodiment of the present disclosure further provides a mobile terminal, where the mobile terminal includes the foregoing WiFi chip, a codec, and a central processing unit, where the WiFi chip receives a streaming media packet, and determines whether the streaming media packet is an error streaming media packet according to a first CRC code of the streaming media packet, if the streaming media packet is an error streaming media packet, determines whether a TCP/IP header of the streaming media packet is correct, if the TCP/IP header of the streaming media packet is correct, determines whether the streaming media packet is preset streaming media, and if the streaming media packet is preset streaming media, calculates a second CRC of the streaming media packet, combines the second CRC with the streaming media packet, and transmits the streaming media packet combined with the second CRC to the central processing unit, the central processing unit processes the streaming media packet according to the second CRC, and transmits the processed streaming media packet to the codec, and the codec performs corresponding processing on the streaming media packet processed by the central processing unit.

In the embodiments of the present disclosure, a WiFi chip receives a streaming media packet, determines, according to a CRC code, whether an error occurs in the packet in a transmission process, and if an error occurs in the packet in a transmission process, further determines whether a TCP/IP header of the streaming media packet is correct. If the TCP/IP header is correct, and the streaming media packet is preconfigured streaming media, the WiFi chip may transmit the streaming media packet to an upper-layer application, and a codec performs error correction and decoding to obtain original multimedia information. Therefore, according to the embodiments of the present disclosure, in a scenario of wirelessly transmitting streaming media, a WiFi chip transmits some error packets to a central processing unit such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

DESCRIPTION OF EMBODIMENTS

The following further describes the technical solutions of the present disclosure in detail using accompanying drawings and embodiments.

In practical application, as a new streaming media packet processing method, a streaming media packet processing method, an apparatus, and a mobile terminal that are provided in embodiments of the present disclosure may be applied to a scenario of wirelessly transmitting streaming media. In the scenario of wirelessly transmitting streaming media, after receiving an error streaming media packet, a WiFi chip determines whether the error streaming media packet is preconfigured streaming media, and if the error streaming media packet is preconfigured streaming media, the WiFi chip may transmit the streaming media packet to a central processing unit, and a codec performs error correction and decoding. Therefore, in a wireless streaming media environment, a WiFi chip transmits some error packets to a central processing unit, and the central processing unit accesses an operating system or another upper-layer application program in a memory and processes the error packets such that a codec performs corresponding processing on the packets to obtain original encoding/decoding information, which avoids retransmitting all the error packets, and further improves an anti-interference capability of the WiFi chip during streaming media transmission.

The central processing unit mentioned in this application document refers to a core processor of the mobile terminal.

Figure 1:
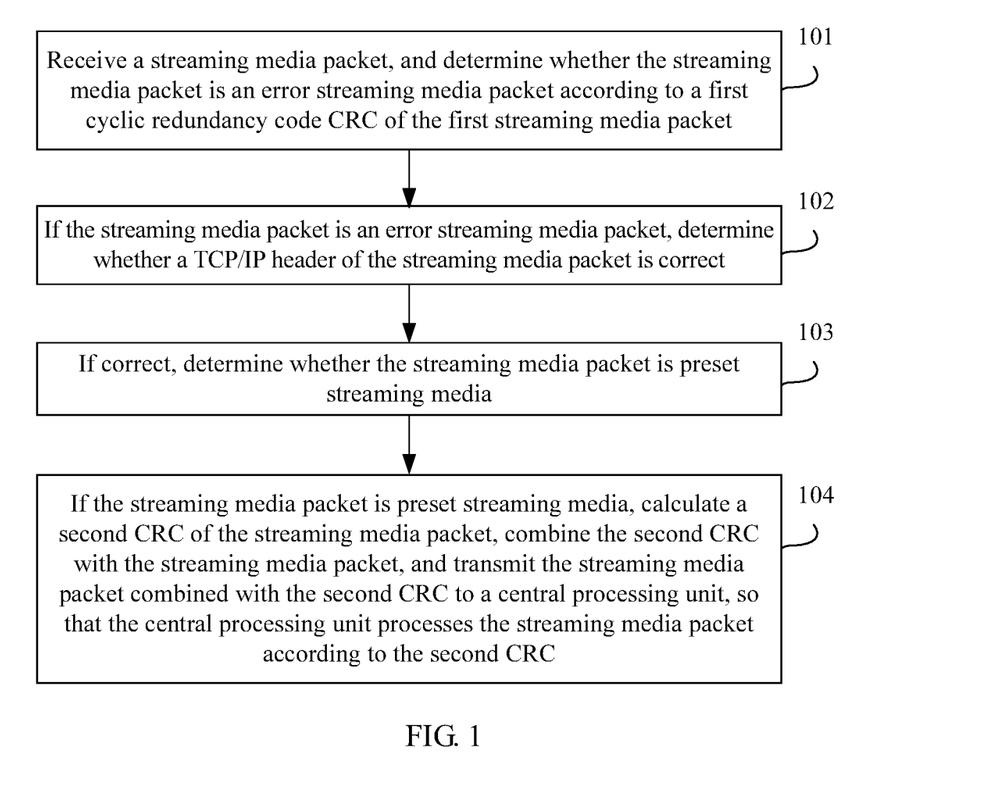
FIG. 1 is a flowchart of a streaming media packet processing method according to an embodiment of the present disclosure.

FIG. 1 is a flowchart of a streaming media packet processing method according to an embodiment of the present disclosure. This embodiment is executed by a WiFi chip in a mobile terminal, and a process in which the WiFi chip receives and processes a streaming media packet is described in detail. As shown in FIG. 1, this embodiment includes the following operating steps Step 101: Receive a streaming media packet, and determine whether the streaming media packet is an error streaming media packet according to a first CRC of the streaming media packet.

For example, after receiving the streaming media packet, the WiFi chip calculates a CRC check of the packet using a check algorithm and determines whether the streaming media packet is an error streaming media packet by calculating the first CRC of the streaming media packet, and determining whether the first CRC obtained through calculation is consistent with a CRC in the received streaming media packet. If inconsistent, the WiFi chip determines that the streaming media packet is an error streaming media packet. If not inconsistent, the WiFi chip determines that the streaming media packet is a correct streaming media packet, and transmitting the correct streaming media packet to a central processing unit for processing.

For example, after receiving a packet, the WiFi chip obtains a first CRC by calculating a check value of a part of the packet excluding a CRC. The following illustrates a process of calculating a CRC of a packet using a most commonly used CRC-16 as an example.

A CRC-16 code includes two bytes, and each bit of a CRC register is preset to 1. Then, exclusive or processing is performed on data in the CRC register and 8-bit data in the packet. Then, bits of the CRC register are shifted in descending order, and zero is padded to a location of a most significant bit (MSB). If a least significant bit (LSB), which is removed from the CRC register after shifting, is 1, exclusive or is performed on the data in the register and a predefined polynomial code. Otherwise, if the LSB is zero, there is no need to perform exclusive or. The foregoing shifting in descending order is repeated eight times, and processing on the first 8-bit data is completed. Exclusive or is performed on a current value of the CRC register and next 8-bit data of the packet, and eight times of shifting similar to that for the previous data is performed. After processing on all characters is completed, a value in the CRC register is a final CRC value.

The foregoing briefly describes only one method for calculating a CRC of a packet, and the method for calculating a CRC of a packet is not limited in this embodiment of the present disclosure.

It should be noted that there are multiple processes of calculating a CRC in subsequent solutions of the embodiments of the present disclosure. The method for calculating a CRC is unchanged, and only calculation content changes.

If it is determined that an error occurs in the received streaming media packet, step 102 is performed.

Step 102: If the streaming media packet is an error streaming media packet, determine whether a TCP/IP header of the streaming media packet is correct.

After receiving the error streaming media packet, the WiFi chip may determine whether the TCP/IP header of the streaming media packet is correct according to a check code of the TCP/IP header of the streaming media packet. For example, if a check code that is of the TCP/IP header of the streaming media packet and obtained through calculation is consistent with the check code of the TCP/IP header of the streaming media packet, it is determined that the TCP/IP header of the streaming media packet is correct.

A check code of a TCP/IP header of a packet may be obtained by calculating a header of a TCP packet segment.

In addition, the check code of the TCP/IP header of the streaming media packet may be parsed out from the streaming media packet, and is filled, after being calculated by a sender according to a header of streaming media, into the header.

If correct, step 103 is performed, and if incorrect, the streaming media packet is directly discarded.

Step 103: If the TCP/IP header of the streaming media packet is correct, determine whether the streaming media packet is preset streaming media.

For example, whether the streaming media packet is preset streaming media may be determined by first determining whether the streaming media packet is a RTCP packet, if the streaming media packet is a RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media.

To implement the technical solution provided in this embodiment of the present disclosure, in practical application, a list of preset streaming media or another correspondence that may be used to indicate which packet is preset streaming media needs to be preconfigured in the mobile terminal, where protocols and port numbers corresponding to all preset streaming media or other feature information of the preset streaming media is included. Other feature information of streaming media herein refers to feature information that can be used to identify whether the streaming media is preset streaming media. For example, the streaming media has a type parameter, where different types, or type parameters, represent different streaming media, such as a sound stream, a video stream, a text stream, an image stream, and an animation stream.

Step 104: If the streaming media packet is preset streaming media, calculate a second CRC of the streaming media packet, combine the second CRC with the streaming media packet, and transmit the streaming media packet combined with the second CRC to a central processing unit such that the central processing unit processes the streaming media packet according to the second CRC.

Transmitting the streaming media packet combined with the second CRC to a central processing unit such that the central processing unit processes the streaming media packet according to the second CRC includes transmitting the streaming media packet combined with the second CRC to the central processing unit such that the central processing unit calculates a third CRC of the streaming media packet combined with the second CRC, determines whether the second CRC is consistent with the third CRC, and if the second CRC is consistent with the third CRC, transmits the streaming media packet combined with the second CRC to a codec for corresponding processing, to obtain original multimedia information.

The corresponding processing performed by the codec in this embodiment of the present disclosure includes error correction and encoding/decoding processing.

It should be noted that combining the second CRC with the streaming media packet refers to appending the second CRC to the end of the streaming media packet.

The central processing unit may calculate, using a CRC calculation method, a CRC of the streaming media packet combined with the second CRC, where CRC calculation content herein changes to the streaming media packet combined with the second CRC, and the calculation method is unchanged.

A method for calculating the third CRC of the streaming media packet is performing CRC calculation on a header and packet content that are of the streaming media packet combined with the second CRC.

For example, if it is determined that the error streaming media packet is preset streaming media, a CRC of the streaming media packet is recalculated, where what is calculated herein is a CRC of a part of the packet excluding the TCP/IP header, that is, the second CRC. After the second CRC is calculated, the streaming media packet is combined with the second CRC and is uploaded to the central processing unit, and the central processing unit accesses an operating system or another upper-layer application in a memory and processes the packet. The streaming media packet may also be uploaded to another process that is used to process streaming media data for processing. For example, when the central processing unit receives the streaming media packet and performs a check, and if a check result is that no error occurs in a process in which the packet is transmitted from the WiFi chip to the central processing unit, that is, the third CRC obtained by the central processing unit by performing CRC calculation on the received streaming media packet is consistent with the second CRC, the central processing unit transmits the streaming media packet to the codec in the mobile terminal for corresponding processing, and the original multimedia information can be obtained.

According to this embodiment of the present disclosure, after receiving an error streaming media packet, a WiFi chip determines whether the error streaming media packet is preconfigured streaming media, and if the error streaming media packet is preconfigured streaming media, the WiFi chip may transmit the streaming media packet to a central processing unit, and a codec performs corresponding processing. Therefore, in a wireless streaming media environment, a WiFi chip transmits some error packets to a central processing unit such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

Figure 2:
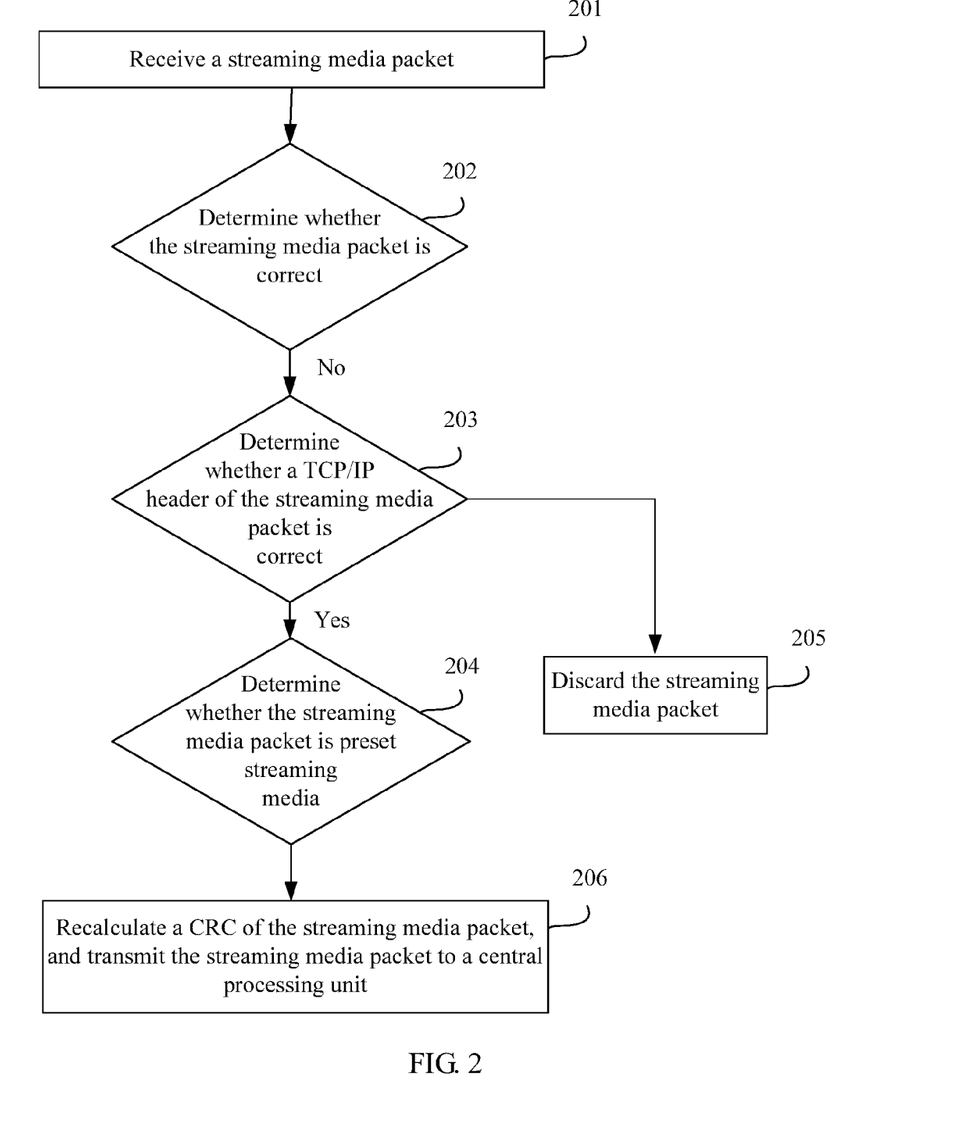
FIG. 2 is a flowchart of another streaming media packet processing method according to an embodiment of the present disclosure.

FIG. 2 is a flowchart of another streaming media packet processing method according to an embodiment of the present disclosure. This embodiment is executed by a WiFi chip, and as shown in FIG. 2, this embodiment includes the following steps.

Step 201: Receive a streaming media packet.

Step 202: Determine whether the streaming media packet is correct.

For example, after receiving the streaming media packet, the WiFi chip calculates a CRC code of the packet using a check algorithm, and determines whether a first CRC obtained through calculation is consistent with a CRC in the received streaming media packet, if inconsistent, determines that the streaming media packet is an error streaming media packet, and otherwise, determines that the streaming media packet is a correct streaming media packet.

If the streaming media packet is an error streaming media packet, step 203 is performed.

Step 203: Determine whether a TCP/IP header of the streaming media packet is correct.

After receiving the error streaming media packet, the WiFi chip may determine whether the TCP/IP header of the streaming media packet is correct according to a check header of the TCP/IP header of the streaming media packet.

If the TCP/IP header of the streaming media packet is correct, step 204 is performed, and if the TCP/IP header of the streaming media packet is incorrect, step 205 is performed.

Step 204: Determine whether the streaming media packet is preset streaming media.

For example, the determining whether the streaming media packet is preset streaming media includes determining whether the streaming media packet is an RTCP packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and directly discarding the streaming media packet.

To implement the technical solution provided in this embodiment of the present disclosure, in practical application, a list of preset streaming media or another correspondence that may be used to indicate which packet is preset streaming media needs to be preconfigured in a mobile terminal, where protocols and port numbers corresponding to all preset streaming media or other feature information of the preset streaming media is included. Other feature information of streaming media herein refers to feature information that can be used to identify whether the streaming media is preset streaming media. For example, the streaming media has a type parameter, and different types, or type parameters, represent different streaming media, such as a sound stream, a video stream, a text stream, an image stream, and an animation stream.

If the streaming media packet is preset streaming media, step 206 is performed, and If the streaming media packet is not preset streaming media, step 205 is performed.

Step 205: Discard the streaming media packet.

If the TCP/IP header of the streaming media packet is wrong, or the TCP/IP header of the streaming media packet is correct but the packet is not preset streaming media, the streaming media packet is discarded.

Step 206: Recalculate a CRC of the streaming media packet, and transmit the streaming media packet to a central processing unit.

If the TCP/IP header of the streaming media packet is correct, and it is determined that the streaming media packet is preset streaming media, the CRC of the streaming media packet may be recalculated. What is calculated herein is a CRC of a part excluding the TCP/IP header, that is, a second CRC. After the second CRC is calculated, the streaming media packet is combined with the second CRC, and is uploaded to an upper-layer application such as a central processing unit. The central processing unit receives the streaming media packet and performs a check, and if a check result is that no error occurs in a process in which the packet is transmitted from the WiFi chip to the central processing unit, that is, a third CRC obtained by the central processing unit by performing CRC calculation on the received streaming media packet is consistent with the second CRC, the central processing unit transmits the streaming media packet to a codec in a mobile terminal for corresponding processing, and original multimedia information can be obtained.

Therefore, according to this embodiment of the present disclosure, in a wireless streaming media environment, a WiFi chip transmits some error packets to an upper-layer application such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

Figure 3:
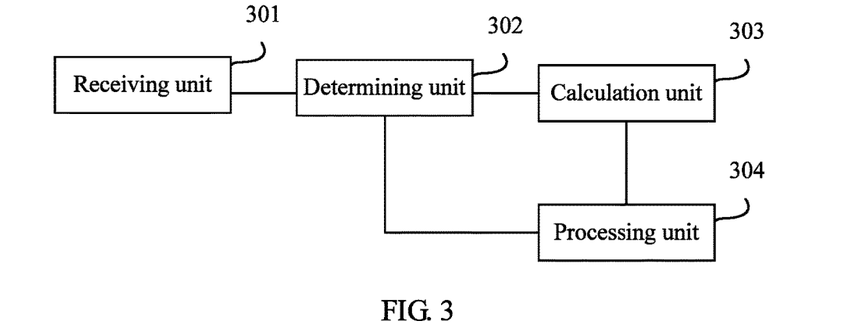
FIG. 3 is a schematic diagram of a WiFi chip according to an embodiment of the present disclosure.

Correspondingly, an embodiment of the present disclosure further provides a WiFi chip. FIG. 3 is a schematic diagram of a WiFi chip according to an embodiment of the present disclosure. As shown in FIG. 3, the apparatus includes the following function modules: a receiving unit 301, a determining unit 302, a calculation unit 303, and a processing unit 304.

The receiving unit 301 is configured to receive a streaming media packet, and transmit the streaming media packet to the determining unit.

The determining unit 302 is configured to receive the streaming media packet transmitted by the receiving unit, determine whether the streaming media packet is an error streaming media packet according to a CRC code of the first streaming media packet, if the streaming media packet is an error streaming media packet, further determine whether a TCP/IP header of the streaming media packet is correct, and if the TCP/IP header of the streaming media packet is correct, further determine whether the streaming media packet is preset streaming media, and transmit a result of the determining to the calculation unit.

A process in which the determining unit 302 determines whether the TCP/IP header of the streaming media packet is correct includes determining whether the TCP/IP header of the streaming media packet is correct according to a check header of the TCP/IP header of the streaming media packet.

For example, if a check code that is of the TCP/IP header of the streaming media packet and obtained through calculation is consistent with the check header of the TCP/IP header of the streaming media packet, it is determined that the TCP/IP header of the streaming media packet is correct.

A process in which the determining unit 302 determines whether the streaming media packet is preset streaming media includes determining whether the streaming media packet is an RTCP packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and directly discarding the streaming media packet.

To implement the technical solution provided in this embodiment of the present disclosure, in practical application, a list of preset streaming media or another correspondence that may be used to indicate which packet is preset streaming media needs to be preconfigured in a mobile terminal, where protocols and port numbers corresponding to all preset streaming media or other feature information of the preset streaming media is included. Other feature information of streaming media herein refers to feature information that can be used to identify whether the streaming media is preset streaming media. For example, the streaming media has a type parameter, and different types, or type parameters, represent different streaming media, such as a sound stream, a video stream, a text stream, an image stream, and an animation stream.

The calculation unit 303 is configured to receive the result of the determining transmitted by the determining unit, and if the result of the determining is that the streaming media packet is preset streaming media, calculate a second CRC of the streaming media packet, and transmit the second CRC to the processing unit.

A process in which the calculation unit 303 calculates the second CRC of the streaming media packet includes calculating a CRC of a part of the streaming media packet excluding the TCP/IP header.

The calculation unit 303 is further configured to calculate the first CRC of the streaming media packet and transmit the first CRC to the determining unit. A process in which the determining unit 302 determines whether the streaming media packet is an error streaming media packet according to the CRC code of the first streaming media packet includes determining whether the first CRC obtained through calculation is consistent with a CRC in the received streaming media packet, if inconsistent, determining that the streaming media packet is an error streaming media packet, and otherwise, determining that the streaming media packet is a correct streaming media packet.

The processing unit 304 is configured to combine the second CRC with the streaming media packet, and transmit the streaming media packet combined with the second CRC to a central processing unit such that the central processing unit processes the streaming media packet according to the second CRC.

The processing unit 304 is further configured to if the determining unit determines that the TCP/IP header of the streaming media packet is incorrect, discard the streaming media packet, and if the determining unit determines that the streaming media packet is not preset streaming media, discard the streaming media packet.

The processing unit 304 is configured to transmit the streaming media packet combined with the second CRC to the central processing unit such that the central processing unit calculates a third CRC of the streaming media packet combined with the second CRC, determines whether the second CRC is consistent with the third CRC, and if the second CRC is consistent with the third CRC, transmits the streaming media packet combined with the second CRC to a decoder for corresponding processing, to obtain original multimedia information.

For example, if it is determined that the error streaming media packet is preset streaming media, a CRC of the streaming media packet is recalculated, where what is calculated herein is a CRC of a part of the packet excluding the TCP/IP header, that is, the second CRC. After the second CRC is calculated, the streaming media packet is combined with the second CRC and is uploaded to the central processing unit, and the central processing unit accesses an operating system or another upper-layer application in a memory and processes the packet. Certainly, the streaming media packet may also be uploaded, to another process that is used to process streaming media data, for processing. For example, when the central processing unit receives the streaming media packet and performs a check, and if a check result is that no error occurs in a process in which the packet is transmitted from the WiFi chip to the central processing unit, that is, the third CRC obtained by the central processing unit by performing CRC calculation on the received streaming media packet is consistent with the second CRC, the central processing unit transmits the streaming media packet to a codec in a mobile terminal for corresponding processing, and the original multimedia information can be obtained.

Therefore, according to the apparatus provided in this embodiment of the present disclosure, in a scenario of wirelessly transmitting streaming media, a WiFi chip transmits some error packets to a central processing unit such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

Figure 4:
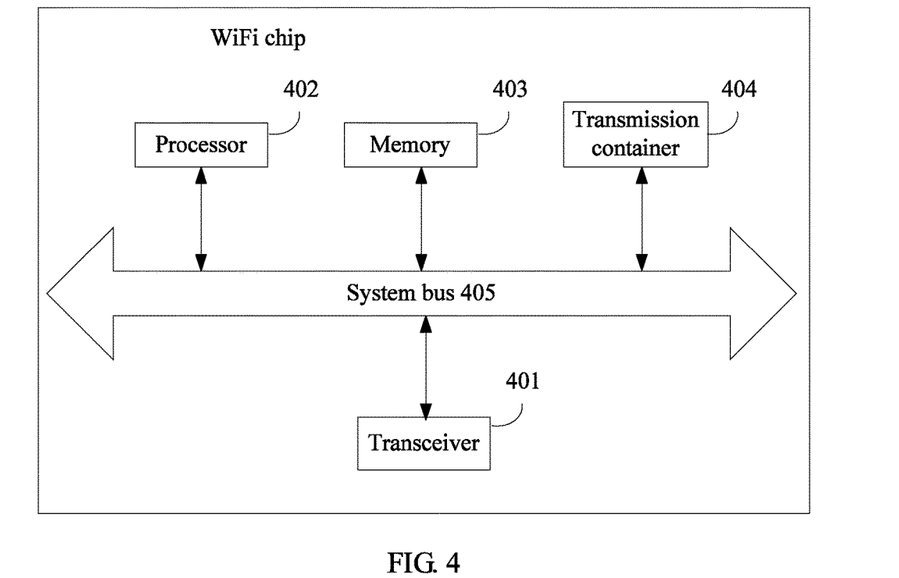
FIG. 4 is a schematic diagram of another WiFi chip according to an embodiment of the present disclosure.

Correspondingly, an embodiment of the present disclosure further provides a WiFi chip, where the chip is applied to a mobile terminal that includes the WiFi chip and a central processing unit. FIG. 4 is a schematic diagram of another WiFi chip according to an embodiment of the present disclosure. As shown in the FIG. 4, the chip includes a transceiver 401, a processor 402, a memory 403, and a transmission container 404. A system bus 405 is configured to connect the transceiver 401, the processor 402, the memory 403, and the transmission container 404, and is configured to bear data transmission between devices.

The transceiver 401 is configured to communicate with another network entity.

The memory 403 has software code and a device driver. The processor 402 may be loaded with the software code in the memory 403, and enable, according to the software code, each device to execute a corresponding function. The device driver may be an interface driver.

In the WiFi chip provided in this embodiment of the present disclosure, that the processor is loaded with the software code in the memory 403, and controls, according to the software code, each device to execute the corresponding function is as follows.

The transceiver 401 is configured to receive a streaming media packet.

The processor 402 is configured to determine whether the streaming media packet is an error streaming media packet according to a first CRC code of the streaming media packet received by a receiver 401, and if the streaming media packet is an error streaming media packet, further determine whether a TCP/IP header of the streaming media packet is correct, if the TCP/IP header of the streaming media packet is correct, further determine whether the streaming media packet is preset streaming media, and if the streaming media packet is preset streaming media, calculate a second CRC of the streaming media packet, and combine the second CRC with the streaming media packet.

The transmission container 404 is configured to transmit the streaming media packet combined with the second CRC to the central processing unit of the mobile terminal such that the central processing unit of the mobile terminal processes the streaming media packet according to the second CRC.

To implement the technical solution provided in this embodiment of the present disclosure, in practical application, a list of preset streaming media or another correspondence that may be used to indicate which packet is preset streaming media needs to be preconfigured in the WiFi chip, where protocols and port numbers corresponding to all preset streaming media or other feature information of the preset streaming media is included. Other feature information of streaming media herein refers to feature information that can be used to identify whether the streaming media is preset streaming media. For example, the streaming media has a type parameter, and different types, or type parameters, represent different streaming media, such as a sound stream, a video stream, a text stream, an image stream, and an animation stream. The list of preset streaming media may be stored in the memory 403.

Further, a process in which the processor 402 determines whether the TCP/IP header of the streaming media packet is correct is determining whether the TCP/IP header of the streaming media packet is correct according to a check header of the TCP/IP header of the streaming media packet.

A process in which the processor 402 determines whether the streaming media packet is an error streaming media packet is calculating the first CRC of the streaming media packet, determining whether the first CRC obtained through calculation is consistent with a CRC in the received streaming media packet, if inconsistent, determining that the streaming media packet is an error streaming media packet, and otherwise, determining that the streaming media packet is a correct streaming media packet, and transmitting the correct streaming media packet to the central processing unit for processing.

A process in which the processor 402 calculates the second CRC of the streaming media packet is calculating a CRC of a part of the streaming media packet excluding the TCP/IP header.

A process in which the processor 402 determines whether the streaming media packet is preset streaming media includes determining whether the streaming media packet is an RTCP packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and directly discarding the streaming media packet that is not preset streaming media.

Furthermore, that the transmission container 404 transmits the streaming media packet combined with the second CRC to the central processing unit of the mobile terminal such that the central processing unit of the mobile terminal processes the streaming media packet according to the second CRC includes transmitting the streaming media packet combined with the second CRC to the central processing unit such that the central processing unit calculates a third CRC of the streaming media packet combined with the second CRC, determines whether the second CRC is consistent with the third CRC, and if the second CRC is consistent with the third CRC, transmits the streaming media packet combined with the second CRC to a decoder for corresponding processing, to obtain original multimedia information.

According to this embodiment of the present disclosure, after receiving an error streaming media packet, a WiFi chip determines whether the error streaming media packet is preconfigured streaming media, and if the error streaming media packet is preconfigured streaming media, the WiFi chip may transmit the streaming media packet to a processor, and a codec performs corresponding processing. Therefore, according to this embodiment of the present disclosure, in a scenario of wirelessly transmitting streaming media, a WiFi chip transmits some error packets to a central processing unit such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

Figure 5:
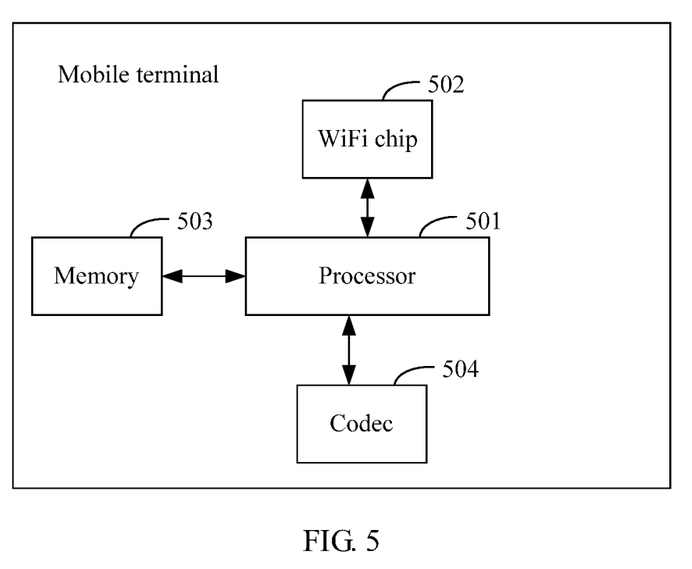
FIG. 5 is a schematic diagram of a mobile terminal according to an embodiment of the present disclosure.

An embodiment of the present disclosure further provides a mobile terminal. FIG. 5 is a schematic diagram of a mobile terminal according to an embodiment of the present disclosure. As shown in FIG. 5, the mobile terminal includes a central processing unit 501, a WiFi chip 502, a memory 503, and a codec 504.

The central processing unit 501 of the mobile terminal is a control center of the mobile terminal, connects all parts of the entire mobile terminal using various interfaces and lines, and executes various functions of the mobile terminal and data processing by running or executing a software program and/or a module that are/is stored in the memory 503 and by invoking data stored in the memory 503 in order to perform overall monitoring on the mobile terminal. Optionally, the central processing unit 501 may include one or more processing units, preferably, the central processing unit 501 mainly processes an operating system, a user interface, an application program, and the like.

The memory 503 may be configured to store a software program and a module. The central processing unit 501 executes various function applications of the mobile terminal and data processing by running the software program and the module that are stored in the memory 503. The memory 503 may mainly include a program storage area and a data storage area, where the program storage area may store an operating system, an application program that is required by at least one function, and the like. In addition, the memory 503 may include a high-speed random access memory, and may further include a non-volatile memory, for example, at least one magnetic disk storage device, a flash device, or another volatile solid-state storage device.

The WiFi chip 502 belongs to a short-range wireless transmission technology. The mobile terminal may help, using the WiFi chip, a user receive and send an email, browse a web page, access streaming media, and the like, and provides the user with wireless broadband Internet access.

In this embodiment of the present disclosure, the WiFi chip 502 may receive a streaming media packet using the short-range wireless transmission technology, and determine whether the streaming media packet is an error streaming media packet according to a first CRC code of the streaming media packet, if the streaming media packet is an error streaming media packet, determine whether a TCP/IP header of the streaming media packet is correct, if the TCP/IP header of the streaming media packet is correct, determine whether the streaming media packet is preset streaming media, and if the streaming media packet is preset streaming media, calculate a second CRC of the streaming media packet, combine the second CRC with the streaming media packet, and transmit the streaming media packet combined with the second CRC to the central processing unit 501 such that the central processing unit 501 processes the streaming media packet according to the second CRC.

The central processing unit 501 processes the streaming media packet according to the second CRC, and transmits the processed streaming media packet to the codec 504.

The codec 504 performs corresponding processing on the streaming media packet processed by a processor.

Further, a process in which the WiFi chip 502 determines whether the TCP/IP header of the streaming media packet is correct includes determining whether the TCP/IP header of the streaming media packet is correct according to a check header of the TCP/IP header of the streaming media packet.

Further, a process in which the WiFi chip 502 calculates the second CRC of the streaming media packet includes calculating a CRC of a part of the streaming media packet excluding the TCP/IP header.

A process in which the WiFi chip 502 determines whether the streaming media packet is preset streaming media includes determining whether the streaming media packet is an RTCP packet, if the streaming media packet is an RTCP packet, further determining whether a port number of the streaming media packet is consistent with a preset port number, if the port number of the streaming media packet is consistent with the preset port number, determining that the streaming media packet is preset streaming media, and if the port number of the streaming media packet is inconsistent with the preset port number, determining that the streaming media packet is not preset streaming media, and if the streaming media packet is not preset streaming media, directly discarding the streaming media packet.

A process in which the WiFi chip 502 transmits the streaming media packet combined with the second CRC to the central processing unit 501 such that the processor 501 processes the streaming media packet according to the second CRC includes transmitting the streaming media packet combined with the second CRC to the processor such that the processor calculates a third CRC of the streaming media packet combined with the second CRC, determines whether the second CRC is consistent with the third CRC, and if the second CRC is consistent with the third CRC, transmits the streaming media packet combined with the second CRC to a decoder for error correction and decoding, to obtain original multimedia information.

Further, a process in which the WiFi chip determines whether the streaming media packet is an error streaming media packet includes calculating the first CRC of the streaming media packet, determining whether the first CRC obtained through calculation is consistent with a CRC in the received streaming media packet, if inconsistent, determining that the streaming media packet is an error streaming media packet, and otherwise, determining that the streaming media packet is a correct streaming media packet.

Therefore, according to this embodiment of the present disclosure, in a scenario of wirelessly transmitting streaming media, a WiFi chip transmits some error packets to a central processing unit such that a codec performs error correction on the packets. If original multimedia information is obtained by means of error correction, a correct receiving response message may be returned to a sender, which prevents the sender from retransmitting all the error packets, and further improves an anti-interference capability of the WiFi chip during streaming media transmission and transmission stability of a multimedia service packet.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc (CD)-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A streaming media packet processing method, applied to a mobile terminal that comprises a Wireless Fidelity (WiFi) chip and a central processing unit, wherein the WiFi chip is configured to execute the following steps:
   receive a streaming media packet, wherein the streaming media packet comprises a first cyclic redundancy code (CRC) and a transmission control protocol/internet protocol (TCP/IP) header;
   calculate a second CRC of the streaming media packet when the first CRC is in error, the TCP/IP header is correct, and the streaming media packet is the preset streaming media;
   combine the second CRC with the streaming media packet; and
   transmit the streaming media packet combined with the second CRC to the central processing unit, wherein the central processing unit is configured to process the streaming media packet according to the second CRC.

2. The streaming media packet processing method according to claim 1, wherein the TCP/IP header of the streaming media packet is correct when a check header of the TCP/IP header of the streaming media packet is correct.

3. The streaming media packet processing method according to claim 1, wherein calculating the second CRC of the streaming media packet comprises calculating a third CRC of a part of the streaming media packet excluding the TCP/IP header.

4. The streaming media packet processing method according to claim 1, wherein the streaming media packet is the preset streaming media when the streaming media packet is a Real-time Transport Protocol Control Protocol (RTCP) packet and a port number of the streaming media packet is consistent with a preset port number.

5. The streaming media packet processing method according to claim 1, wherein transmitting the streaming media packet combined with the second CRC to the central processing unit, wherein the central processing unit is configured to process the streaming media packet according to the second CRC comprises:
   transmitting the streaming media packet combined with the second CRC to the central processing unit, wherein the central processing unit is configured to calculate a third CRC of the streaming media packet combined with the second CRC; and
   transmitting the streaming media packet combined with the second CRC to a decoder for error correction and decoding to obtain original multimedia information when the second CRC is consistent with the third CRC.

6. A mobile terminal, comprising:
   a Wireless Fidelity (WiFi) chip;
   a codec; and
   a central processing unit coupled to the WiFi chip and the codec;
   wherein the WiFi chip is configured to:
      receive a streaming media packet, wherein the streaming media packet comprises a first cyclic redundancy code (CRC) and a transmission control protocol/internet protocol (TCP/IP) header;
      calculate a second CRC of the streaming media packet when the first CRC is in error, the TCP/IP header is correct, and the streaming media packet is the preset streaming media;
      combine the second CRC with the streaming media packet; and
      transmit the streaming media packet combined with the second CRC to the central processing unit,
   wherein the central processing unit is configured to:
      process the streaming media packet according to the second CRC; and
      transmit a processed streaming media packet to the codec, and
   wherein the codec is configured to perform corresponding processing on the streaming media packet received from the central processing unit.

7. The mobile terminal according to claim 6, wherein the TCP/IP header of the streaming media packet is correct when a check header of the TCP/IP header of the streaming media packet is correct.

8. The mobile terminal according to claim 6, wherein the WiFi chip calculating the second CRC of the streaming media packet comprises calculating a third CRC of a part of the streaming media packet excluding the TCP/IP header.

9. The mobile terminal according to claim 6, wherein the streaming media packet is the preset streaming media when the streaming media packet is a Real-time Transport Protocol Control Protocol (RTCP) packet and a port number of the streaming media packet is consistent with a preset port number.

10. The mobile terminal according to claim 6, wherein the WiFi chip is further configured to:
   transmit the streaming media packet combined with the second CRC to the central processing unit, wherein the central processing unit is configured to calculate a third CRC of the streaming media packet combined with the second CRC; and
   transmit the streaming media packet combined with the second CRC to a decoder for error correction and decoding to obtain original multimedia information when the second CRC is consistent with the third CRC.

* * * * *